United States Patent
Iwamura et al.

(10) Patent No.: US 8,798,007 B2
(45) Date of Patent: Aug. 5, 2014

(54) HANDOVER METHOD, RADIO BASE STATION, AND MOBILE STATION

(75) Inventors: Mikio Iwamura, Tokyo (JP); Minami Ishii, Yokohama (JP); Anil Umesh, Yokohama (JP); Wuri Andarmawanti Hapsari, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/379,732

(22) PCT Filed: Jun. 10, 2010

(86) PCT No.: PCT/JP2010/059863
§ 371 (c)(1),
(2), (4) Date: Feb. 22, 2012

(87) PCT Pub. No.: WO2010/150662
PCT Pub. Date: Dec. 29, 2010

(65) Prior Publication Data
US 2012/0140740 A1 Jun. 7, 2012

(30) Foreign Application Priority Data
Jun. 22, 2009 (JP) ................................ P2009-148143

(51) Int. Cl.
*H04W 4/00* (2009.01)
*H04W 36/00* (2009.01)

(52) U.S. Cl.
USPC .......................................... 370/332; 455/436

(58) Field of Classification Search
USPC ......... 370/329, 330, 331, 332, 333, 341, 468;
455/436, 437, 438, 439, 442, 450, 451,
455/452.1, 452.2, 524, 525
See application file for complete search history.

(56) References Cited

U.S. PATENT DOCUMENTS

| 8,295,210 B2 * | 10/2012 | Iwamura et al. ............... 370/278 |
| 2009/0285180 A1 * | 11/2009 | Zhang et al. ................... 370/331 |
| 2010/0046472 A1 * | 2/2010 | Chun et al. ..................... 370/331 |
| 2010/0142470 A1 * | 6/2010 | Park et al. ...................... 370/329 |
| 2010/0173634 A1 | 7/2010 | Kato et al. |
| 2011/0092212 A1 | 4/2011 | Kubota |

FOREIGN PATENT DOCUMENTS

| WO | 2008/111820 A1 | 9/2008 |
| WO | 2008/143163 A1 | 11/2008 |
| WO | 2009/022813 A1 | 2/2009 |
| WO | 2009/154038 A1 | 12/2009 |

OTHER PUBLICATIONS

Office Action for Japanese Patent Application No. 2009-148143 mailed Oct. 4, 2011, with English translation thereof (9 pages).

(Continued)

*Primary Examiner* — Hanh N Nguyen
(74) *Attorney, Agent, or Firm* — Osha Liang LLP (57) ABSTRACT

A radio base station according to the present invention comprising the radio base station eNB#2 comprising a transmission unit 11 configured to transmit C-RNTI that can be used in the cell #2, to the radio base station eNB #1, in response to "HO Preparation (a handover preparation signal)" received from the radio base station eNB #1 that manages the cell #1, and a resource assignment unit 14 configured to notify a radio resource assigned to the mobile station UE by using C-RNTI included in "HO Complete", when it is determined that C-RNTI included in "HO Complete" received from the mobile station UE that can be used in the cell #2.

6 Claims, 9 Drawing Sheets

(56) References Cited

OTHER PUBLICATIONS

International Search Report w/translation from PCT/JP2010/059863 dated Jul. 6, 2010 (4 pages).
3GPP TSG RAN WG2 LTE RRC Ad Hoc, R2-082963; "A solution to resolve potential PCI confusion at handover"; NTT DoCoMo, Inc.; Sophia Antipolis, France; Jun. 5-6, 2008 (3 pages).
3GPP TSG-RAN WG2 meeting #65bis, R2-092113; "Connected mode mobility in the presence of PCI confusion of HeNBs"; Qualcomm Europe; Seoul, Korea; Mar. 23-27, 2009 (4 pages).
Japanese Office Action mailed Oct. 4, 2011 corresponding to Japanese Application No. 2009-148143 (8 pages).
3GPP TS 36.300 V8.9.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Jun. 2009 (159 pages).
3GPP TS 36.331 V8.6.0; "3rd Generation Partnership Project; Technical Specification Group Radio Access Network; Evolved Universal Terrestrial Radio Access (E-UTRA) Radio Resource Control (RRC); Protocol specification (Release 8)"; Jun. 2009 (207 pages).
European Search Report for EP 10 79 1980 mailed Nov. 29, 2012 (14 pages).
3GPP TSG RAN WG2 #62, Tdoc-R2-082622 "Potential Problem of Handover Procedure," NTT DOCOMO, Inc., Kansas City, USA, May 5-9, 2008 (6 pages).
3GPP TSG RAN WG2 #61bis, R2-081806, "Remaining Issues Related to Handover Failure Handling," Motorola, Shenzhen, China, Mar. 31-Apr. 4, 2008 (6 pages).
3GPP TSG RAN WG2 #61bis, Tdoc-R2-081924, "Hanover Failure Handling," NTT DOCOMO, Inc., Shenzhen, China, Mar. 31-Apr. 4, 2008 (5 pages).
3GPP TSG RAN WG2 #61, Tdoc-R2-081806, "Summary of Email Discussion on Handovver Failure Handling," NTT DOCOMO, Inc., Sorrento, Italy, Feb. 11-15, 2008 (11 pages).
3GPP TS 36.321 v8.6.0; "3rd Generation Partnership Project; Technical Specification Group Radio Access Network; Evolved Universal Terrestrial Radio Access (E-UTRA) Medium Access Control (MAC) Protocol Specification (Release 8)," Jun. 18, 2009 (44 pages).
Office Action in corresponding Chinese Application No. 201080027801.7 dated Mar. 12, 2013 (9 pages).
3GPP TSG RAN WG2 #61, Tdoc-R2-081231, "Summary of Email Discussion on Handover Failure Handling," NTT DOCOMO, Inc., Sorrento, Italy, Feb. 11-15, 2008 (11 pages).
Office Action in corresponding Australian Application No. 2010263802, dated Jun. 4, 2013 (4 pages).
Office Action for European Patent Application No. 10 791 980.5, issued Aug. 23, 2013 (8 pages).

* cited by examiner

| CELL | C-RNTI |
|---|---|
| CELL#1 | 1~10 |
| CELL#2 | 11~20 |
| CELL#3 | 21~30 |
| ⋮ | ⋮ |

| CELL | RA-PREAMBLE (DEDICATED) |
|---|---|
| CELL#1 | #1, #2 |
| CELL#2 | #3, #4 |
| CELL#3 | #5, #6 |
| ⋮ | ⋮ |

HANDOVER METHOD, RADIO BASE STATION, AND MOBILE STATION

TECHNICAL FIELD

The present invention relates to a handover method, a radio base station, and a mobile station.

BACKGROUND ART

Figure 9:
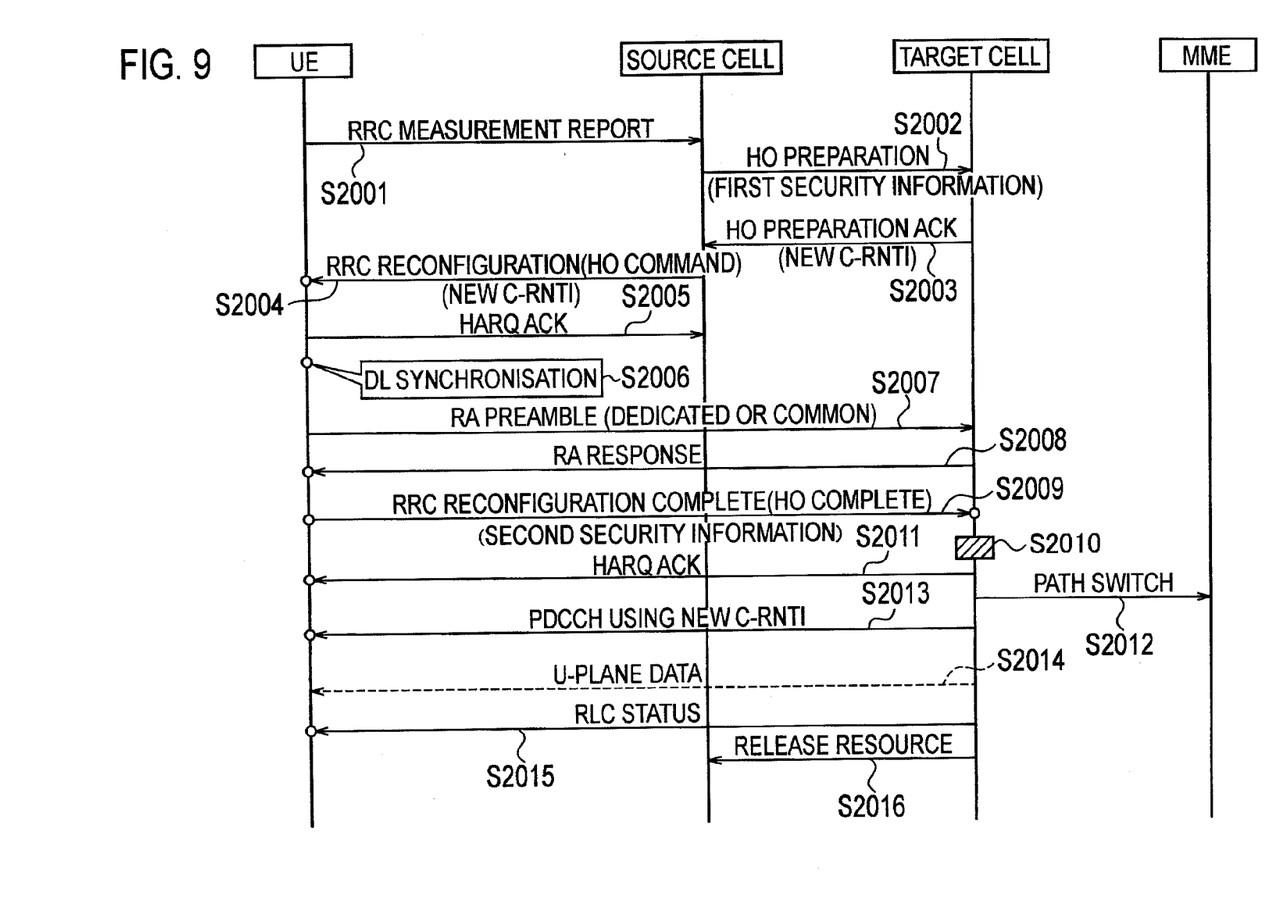
FIG. 9 is a diagram explaining the operation of a conventional mobile communication system.

With reference to FIG. 9, an operation in which a mobile station UE performs handover from a "cell#1 (Source cell)" to a "cell#2 (Target cell)" in a mobile communication system of a conventional LTE (Long Term Evolution) scheme is described.

As shown in FIG. 9, in step S2001, the mobile station UE sends an "RRC Measurement Report" to a radio base station eNB#1 that manages the cell#1.

In step S2002, the radio base station eNB#1 sends "HO Preparation" including "first security information" to a radio base station eNB#2 that manages the cell#2.

The "first security information" may be a security key applied to a communication between a mobile communication system including the cell#1 and the cell#2 and the mobile station UE, or may also be "secret information (shared secret)" calculated based on a certain rule previously determined between the mobile communication system including the cell#1 and the cell#2 and the mobile station UE.

In step S 2003, the radio base station eNB#2 sends "HO Preparation Ack" including "new C-RNTI" which is identification information of the mobile station UE in the cell #2, to the radio base station eNB#1.

In step S2004, the radio base station eNB#1 sends "RRC Reconfiguration (HO Command)" including "new C-RNTI" to the mobile station UE.

In step S2005, the mobile station UE sends "HARQ Ack" to notify the successful reception of "RRC Reconfiguration (HO Command)" in an MAC layer (layer 2) to the radio base station eNB#1.

In step S2006, the mobile station UE moves to the cell#2 instructed by the "RRC Reconfiguration (HO Command)" and establishes a downlink synchronization for the cell#2.

In step S2007, the mobile station UE sends "Dedicated RA Preamble (individual random access preamble)" or "Common RA Preamble (common random access preamble)" to the radio base station eNB#2 via RACH (Random Access Channel).

In step S2008, the radio base station eNB#2 sends "RA Response" to the mobile station UE. An uplink resource that should be used in a next step S2009 is assigned by the "RA Response".

In step S2009, the mobile station UE sends "RRC Reconfiguration Complete (HO Complete)" including "second security information" by using the uplink resource assigned by "RA Response", to the radio base station eNB#2.

In step S2010, the radio base station eNB#2 executes a verification process on the mobile station UE by using "second security information" included in the "first security information" and the "RRC Reconfiguration Complete (HO Complete)" notified by the radio base station eNB#1.

In step S2011, the radio base station eNB#2 sends "HARQ Ack" to notify the successful reception of "RRC Reconfiguration Complete (HO Complete)" in the MAC layer (layer 2), to the mobile station UE.

In step S2012, the radio base station eNB#2 sends "Path Switch" to a mobile switching machine MME.

In step S2013, the radio base station eNB#2 sends scheduling information to the mobile station UE by using "PDCCH (Physical Downlink Control Channel" that uses "new C-RNTI", when data addressed to the mobile station UE is generated.

In step S2014, the radio base station eNB#2 sends data (U-Plane Data) addressed to the mobile station UE to the mobile station UE by using a downlink resource assigned by the scheduling information.

Alternatively, the mobile station UE, in step S2014, sends the data (U-Plane Data) addressed to the cell#2 to the radio base station eNB#2 by using an uplink resource assigned by the scheduling information.

In step S2015, the radio base station eNB#2 sends "RLC Status" that is transmission acknowledgement information of an RLC layer, to the mobile station UE.

In step S2016, the radio base station eNB#2 sends "Release Resource" to the radio base station eNB#1.

Figure 10:
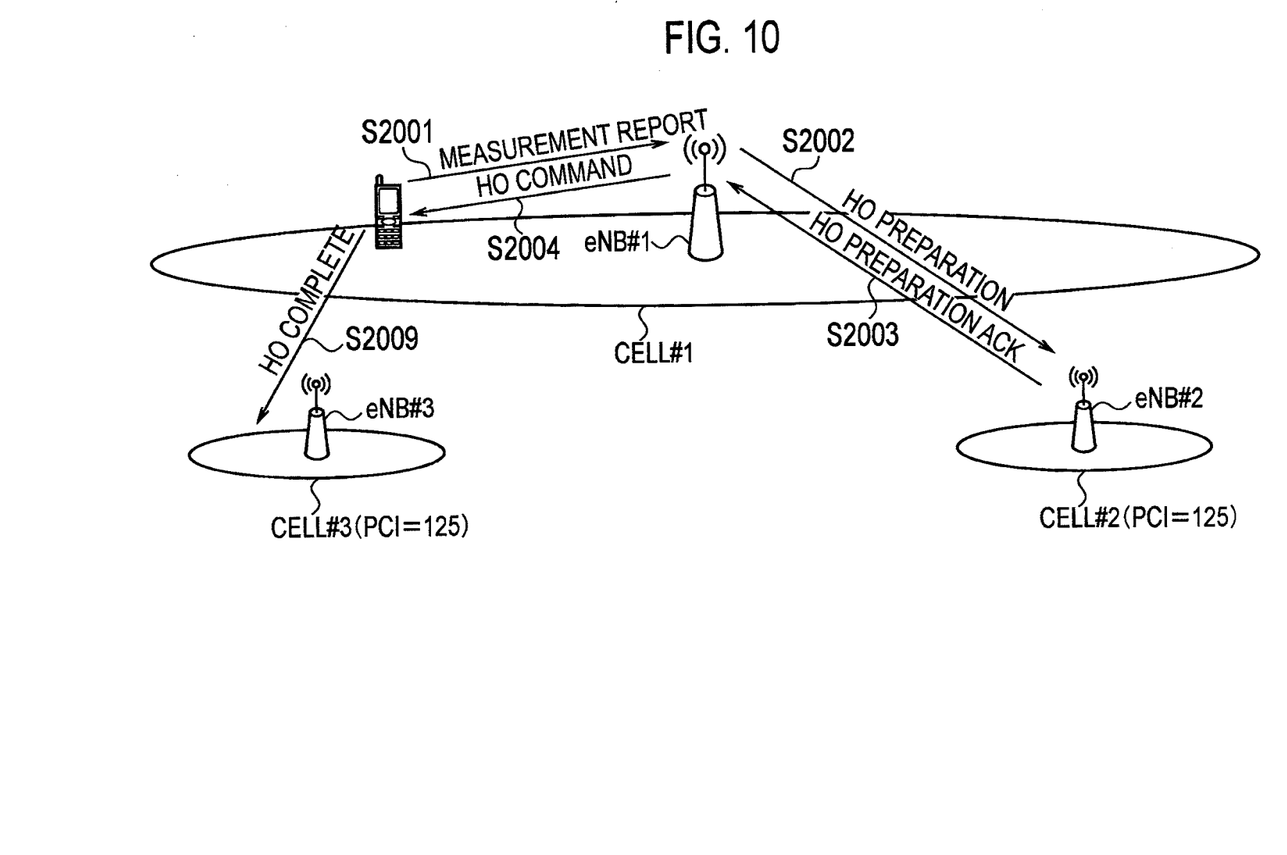
FIG. 10 is a diagram explaining the operation of the conventional mobile communication system.

However, in the mobile communication system of a conventional LTE scheme, as shown in FIG. 10, since the "PCI (Physical Cell ID)", which is the identification information to identify each cell, is configured in such a way that it is repeatedly assigned to a plurality of cells which are not in the vicinity of each other, there can be a case of (PCI Confusion) where a cell (for example, cell#3) assumed by the mobile station UE as the cell#2(Target cell)" and a cell (for example, cell#2) assumed by the radio base station eNB#1 as the "cell#2(Target cell)" are different.

There is a problem that if the mobile station UE performs handover to the cell#3 not intended from the cell#1, then the mobile station UE that has erroneously moved thereto by the handover receives the PDCCH information addressed to another mobile station UE as if this information was addressed to the mobile station UE if another mobile station UE using "C-RNTI" identical to "new C-RNTI" already existed in the cell#3, and as a result, the mobile station UE receives the data by using the downlink resource assigned by PDCCH or transmits the data by using the uplink resource assigned by PDCCH.

In particular, there is a problem that when the mobile station UE transmits HARQ Ack to downlink data or uplink data, communication by another mobile station UE is prevented.

There is a high possibility that such a problem becomes evident when, in particular, there are a number of small base stations such as a femto radio base station, a home radio base station, and a radio base station that manages CSG (closed subscriber cell).

Moreover, there is a possibility that such a problem becomes evident when a self-setting function or self-optimization function that selects and sets the "PCI (Physical Cell ID)" autonomously in each cell is installed.

SUMMARY OF THE INVENTION

Therefore, the present invention is intended to overcome the above-described problem. An object of the present invention is to provide a handover method, a radio base station, and a mobile station by which it is possible to avoid the generation of "PCI Confusion".

A gist of a first characteristic of the present invention is a handover method in which a mobile station performs handover from a first cell to a second cell, in which a first radio base station that manages the first cell comprises a step of transmitting a handover command signal including mobile station identification information that can be used in the second cell, to the mobile station, a step in which the mobile station transmits a common random access preamble to a second radio base station that manages the second cell, after receiving the handover command signal, a step in which the mobile station transmits a handover completion signal including the mobile station identification information included in the handover command signal, to the second radio base station, after receiving a random access response to the common random access preamble and a step in which the second radio base station notifies a radio resource assigned to the mobile station by using the mobile station identification information included in the handover completion signal, when it is determined that the mobile station identification information included in the handover completion signal is the mobile station identification information that can be used in the second cell.

A gist of a second characteristic of the present invention is a handover method in which a mobile station performs handover from a first cell to a second cell, comprising, a step in which a first radio base station that manages the first cell transmits a handover command signal including mobile station identification information, to the mobile station, a step in which the mobile station transmits an individual random access preamble that can be used in the second cell, to a second radio base station that manages the second cell, after receiving the handover command signal, a step in which the second radio base station transmits a random access response to the mobile station when it is determined that the received individual random access preamble is the individual random access preamble that can be used in the second cell, a step in which the mobile station transmits a handover completion signal to the second radio base station, after receiving the random access response and a step in which the second radio base station notifies a radio resource assigned to the mobile station, after receiving the handover completion signal.

A gist of a third characteristic of the present invention is a radio base station that can operate, when a mobile station performs handover from a first cell to a second cell, as a second radio base station that manages the second cell, comprising, a transmission unit configured to transmit mobile station identification information that can be used in the second cell, to the first radio base station, in response to a handover preparation signal received from the first radio base station that manages the first cell and a resource assignment unit configured to notify a radio resource assigned to the mobile station by using the mobile station identification information included in the handover completion signal, when it is determined that the mobile station identification information included in the handover completion signal received from the mobile station is the mobile station identification information that can be used in the second cell.

A gist of a fourth characteristic of the present invention is a radio base station that can operate, when a mobile station performs handover from a first cell to a second cell, as a second radio base station that manages the second cell, comprising, a transmission unit configured to transmit a random access response to the mobile station, when it is determined that the individual random access preamble received from the mobile station is the individual random access preamble that can be used in the second cell and a resource assignment unit configured to notify a radio resource assigned to the mobile station, when the handover completion signal is received from the mobile station after transmitting the random access response to the mobile station.

A gist of a fifth characteristic of the present invention is a mobile station capable of performing handover from a first cell to a second cell, comprising, a random access preamble transmission unit configured to transmit a common random access preamble to a second radio base station that manages the second cell, after receiving a handover command signal including mobile station identification information that can be used in the second cell from the first radio base station that manages the first cell and a handover completion signal transmission unit configured to transmit a handover completion signal including the mobile station identification information included in the handover command signal, to the second radio base station, after receiving a random access response to the common random access preamble.

A gist of a sixth characteristic of the present invention is a mobile station capable of performing handover from a first cell to a second cell, comprising, a random access preamble transmission unit configured to transmit an individual random access preamble that can be used in the second cell to a second radio base station that manages the second cell, after receiving a handover command signal from the first radio base station that manages the first cell, and a handover completion signal transmission unit configured to transmit a handover completion signal to the second radio base station after receiving a random access response to the individual random access preamble from the second radio base station.

As described above, according to the present invention, it is possible to provide a handover method, a radio base station, and a mobile station by which it is possible to avoid the generation of "PCI Confusion".

DETAILED DESCRIPTION

Figure 1:
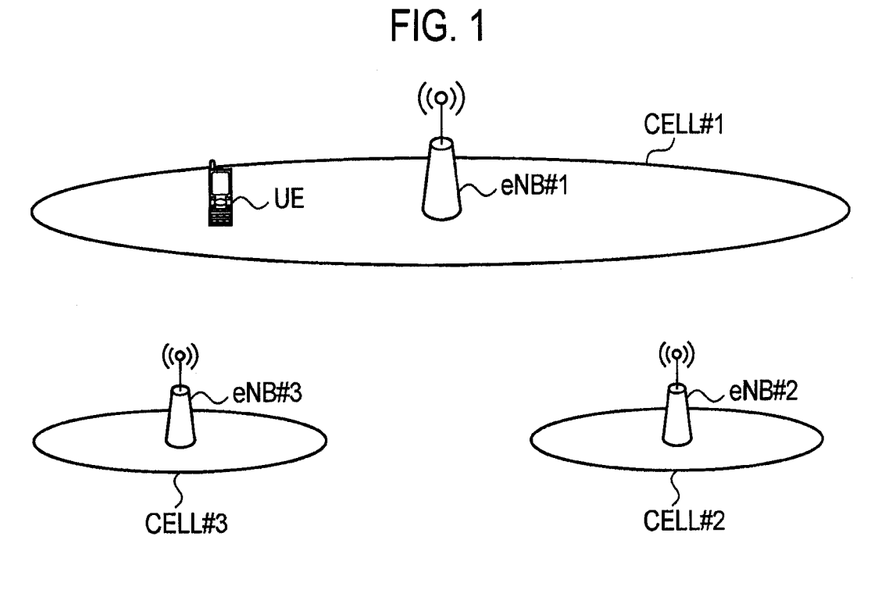
FIG. 1 is an entire configuration diagram of a mobile communication system according to a first embodiment of the present invention.
Figure 4:
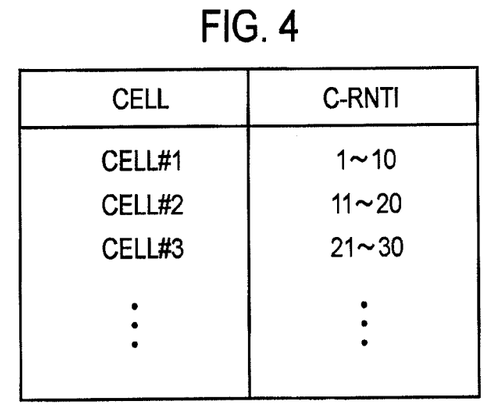
FIG. 4 is a diagram showing an example of C-RNTI used in each cell in the mobile communication system according to the first embodiment of the invention.

Configuration of Mobile Communication System According to First Embodiment of Present Invention With reference to FIG. 1 and FIG. 4, the configuration of a mobile communication system according to a first embodiment of the present invention is described.

The mobile communication system according to the first embodiment of the present invention is a mobile communication system of an LTE scheme and includes a radio base station eNB#1 that manages a cell#1, a radio base station eNB#2 that manages a cell#2, and a radio base station eNB#3 that manages a cell#3.

As shown in FIG. 1, in the mobile communication system of the present embodiment, the mobile station UE is configured to perform handover from a "cell#1 (Serving cell, Source cell)" to a "cell#2 (Target Cell)".

Further, since radio base stations eNB#1 and eNB#3 have largely identical configurations, the configuration of the radio base station eNB is described below.

Figure 2:
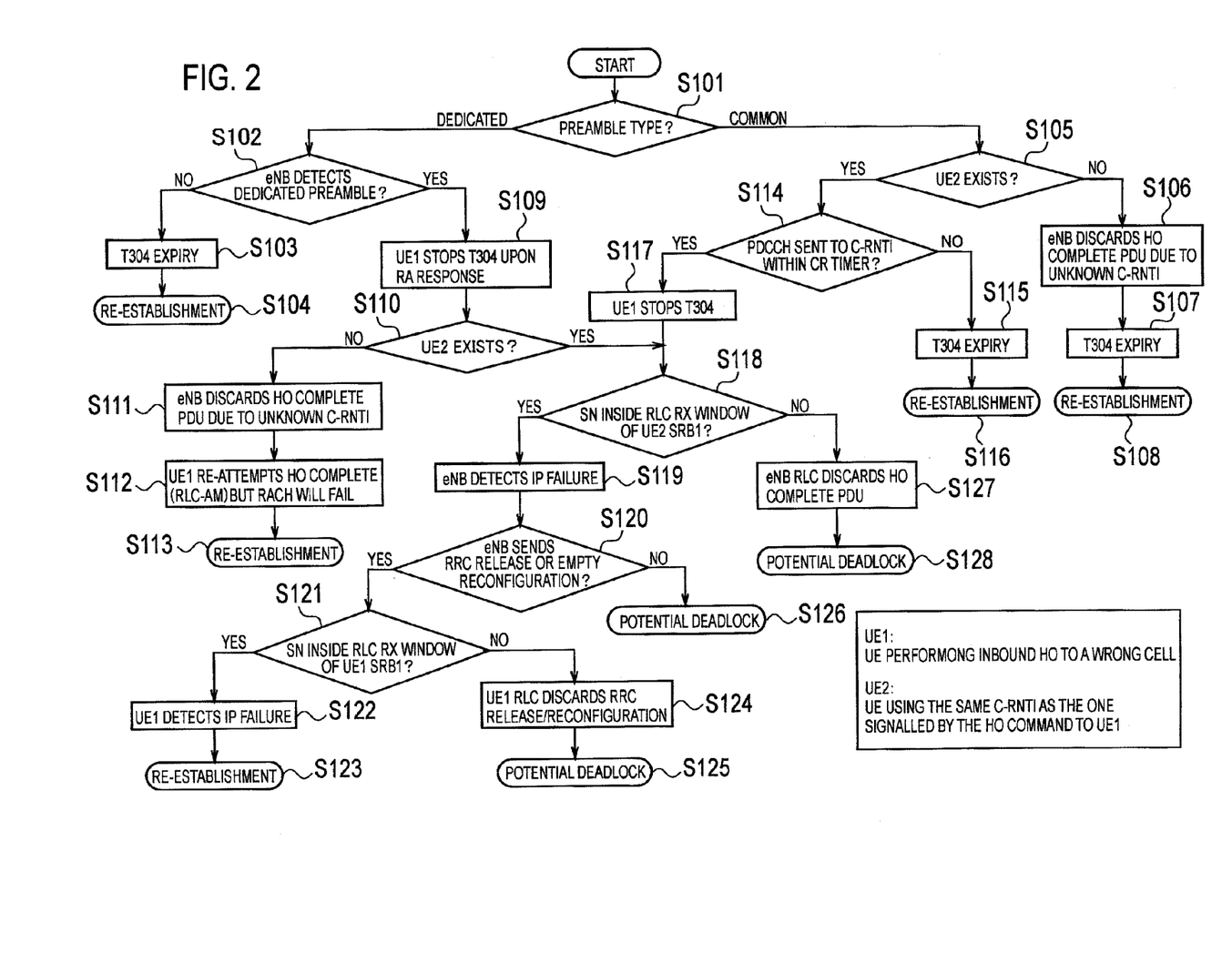
FIG. 2 is a flowchart explaining the operation of the mobile communication system according to the first embodiment of the present invention.

FIG. 2 shows the operation of the mobile communication system in the present embodiment when "PCI Confusion" is generated.

As shown in FIG. 2, if "PCI Confusion" is generated in the mobile communication system of the present embodiment, it is assumed that either "Re-establishment (re-connection procedure)" is executed or the state becomes "Deadlock"

Here, if "PCI Confusion" is generated, preferably the "Deadlock" state should be avoided. Consequently, if "PCI Confusion" is generated, the mobile communication system of the present embodiment is configured so that "Re-establishment" of step S108 shown in FIG. 2 is executed. Such configured mobile communication system of the present embodiment is described below.

Figure 3:
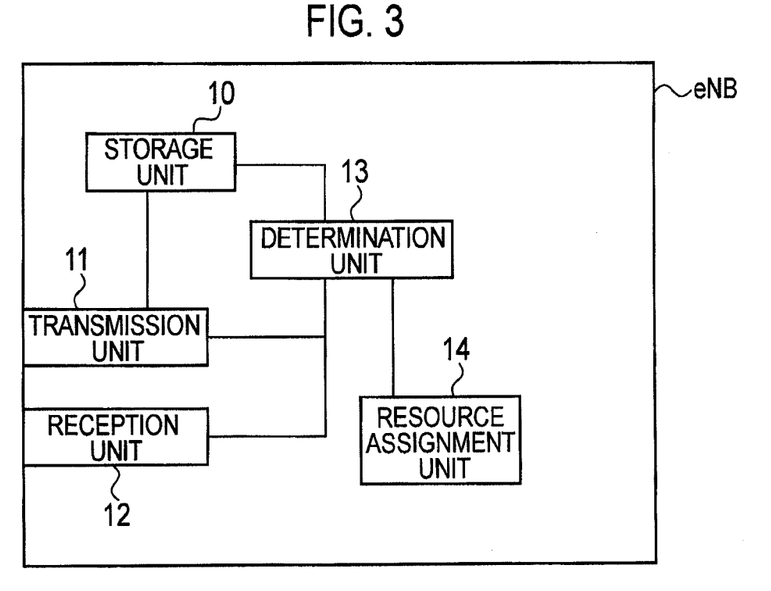
FIG. 3 is a function block diagram of a radio base station according to the first embodiment of the present invention.

As shown in FIG. 3, the radio base station eNB includes a storage unit 10, a transmission unit 11, a reception unit 12, a determination unit 13, and a resource assignment unit 14.

If the radio base station eNB operates as the radio base station eNB#2 that manages the "cell#2 (Target Cell)", the storage unit 10 is configured to manage "C-RNTI (Cell-Radio Network Temporary ID, mobile station identification information)" that can be used in the cell#2.

Further, in the mobile communication system according to the present embodiment, as shown in FIG. 4, each cell specific C-RNTI, i.e., C-RNTI that can be used in each cell, is specified.

Such usable C-RNTI is specified to avoid the overlapping among cells that may lead to "PCI Confusion" (in other words, among the neighboring cells using the same PCI).

The transmission unit 11 is configured to send a signal to the mobile station UE, another radio base station eNB, etc.

For example, the configuration is such that if the radio base station eNB operates as the radio base station eNB#2, the transmission unit 11 sends a C-RNTI (for example, C-RNTI#11) assigned to the mobile station UE by "Ho Command (handover control signal)" from among the C-RNTI that can be used in the cell#2, to the radio base station eNB#1, by "HO Preparation ACK (response)" for "HO Preparation (handover preparation signal)" received from the radio base station eNB#1 that manages the cell#1.

The reception unit 12 is configured to receive the signal sent by the mobile station UE, the other radio base station eNB, etc.

The determination unit 13 is configured to determine whether the C-RNTI included in "HO Complete (handover completion signal)" sent by the mobile station UE and received by the reception unit 12 is the C-RNTI that can be used in the cell#2.

The resource assignment unit 14 is configured to assign a radio resources to the mobile station UE that is handed over to a cell subordinate to the radio base station eNB and to notify the mobile station UE of the radio resource.

Here, if the determination unit 13 determines that the C-RNTI included in "HO Complete" is the C-RNTI that can be used in the cell#2, the resource assignment unit 14 is configured to use the C-RNTI included in "HO Complete" to notify the radio resource assigned to the mobile station UE.

Further, if it is determined that the C-RNTI included in "HO Complete" is not the C-RNTI that can be used in the cell#2, the resource assignment unit 14 may be configured to discard the "HO Complete" without assigning the radio resource to the mobile station UE (in other words, without notifying the radio resource assigned to the mobile station UE).

Figure 5:
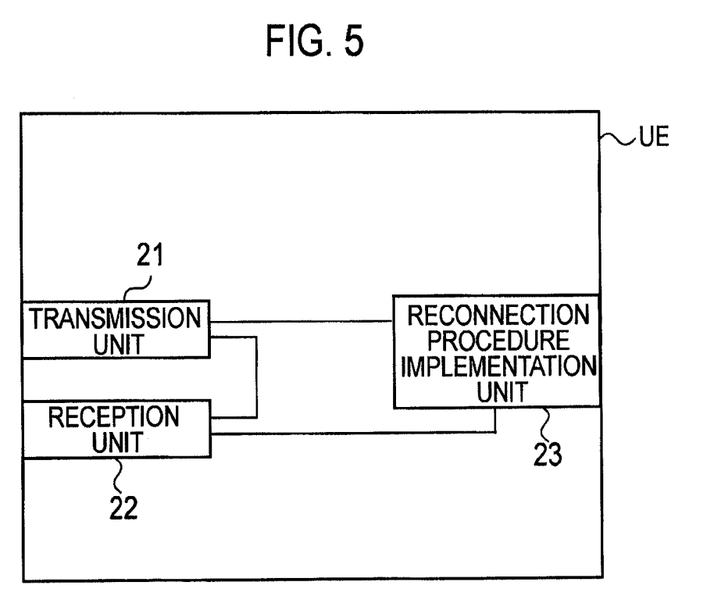
FIG. 5 is a functional block diagram of the mobile station according to the first embodiment of the present invention.

As shown in FIG. 5, the mobile station UE includes a transmission unit 21, a reception unit 22, and a reconnection procedure implementation unit 23.

The transmission unit 21 is configured to send a signal to the radio base station eNB, and the reception unit 22 is configured to receive the signal sent by the radio base station eNB.

For example, the configuration is such that after the reception unit 22 receives "HO Command (handover command signal)" including C-RNTI that can be used in the cell#2 from the radio base station eNB#1, the transmission unit 21 sends "Common RA Preamble (common random access preamble)" to the radio base station eNB#2.

Moreover, the configuration is such that after the reception unit 22 receives "RA Response (random access response)" for "Common RA Preamble", the "HO Complete" including the C-RNTI included in the "HO Command" is sent to the radio base station eNB#2.

The reconnection procedure implementation unit 23 is configured to implement a reconnection procedure (Re-establishment), if a predetermined period elapses (for example, when a timer T304 which is activated at the time of receiving "HO Command" is expired) without the notification of the radio resource assigned by the radio base station eNB#2, after the "HO Command" is sent by the transmission unit 21.

Operation of Mobile Communication System
According to First Embodiment of Present Invention The operation of the mobile communication system according to the first embodiment of the present invention is described with reference to FIG. 6. Further, the description given below emphasizes a difference between the operation of the mobile communication system according to the first embodiment of the present invention and the operation described in the preceding FIG. 9.

Figure 6:
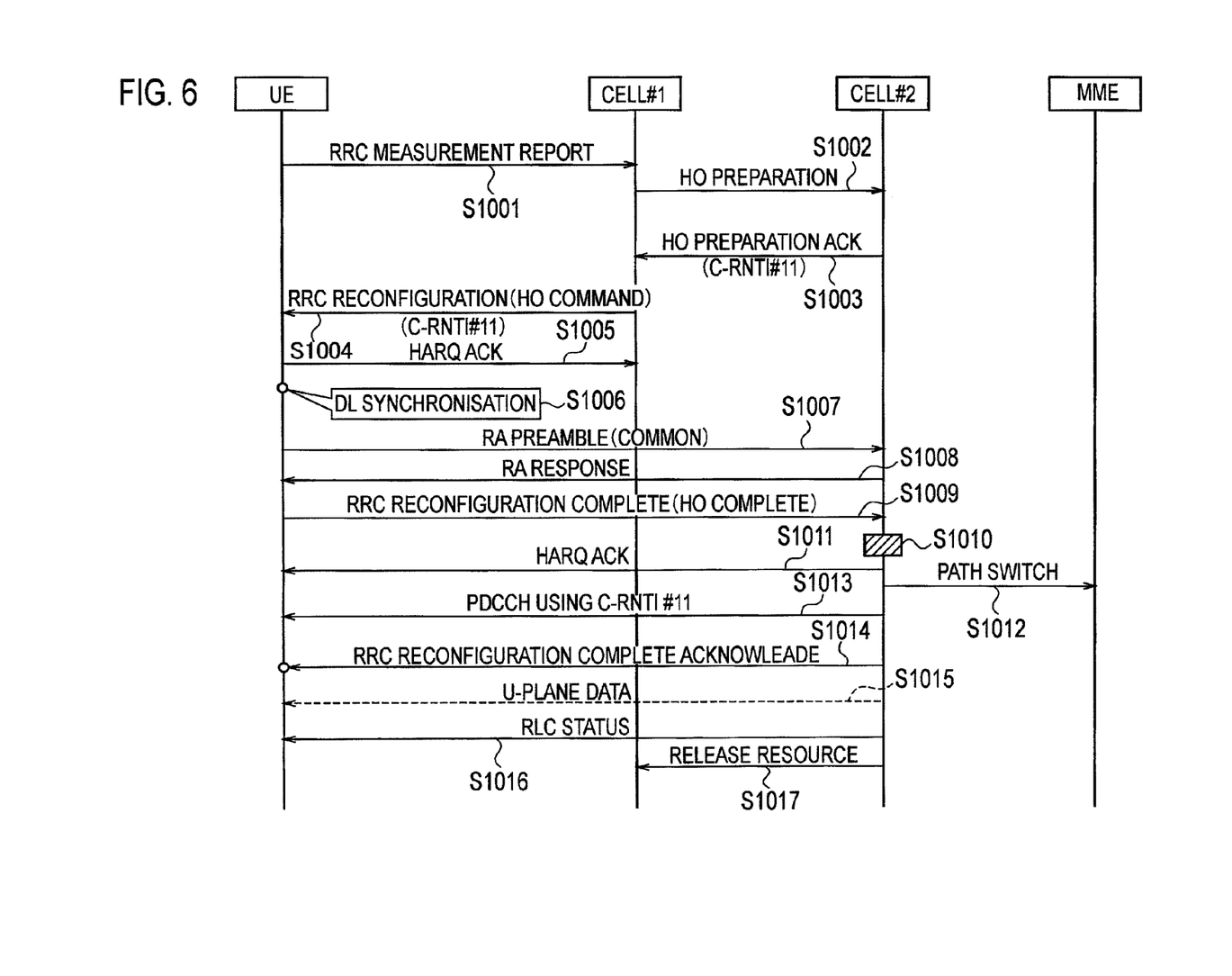
FIG. 6 is a sequence chart showing the operation of the mobile communication system according to the first embodiment of the present invention.

As shown in FIG. 6, in step S1001, the mobile station UE sends "RRC Measurement Report" to the radio base station eNB#1 that manages the cell#1.

In step S1002, the radio base station eNB#1 sends "HO Preparation" including "first security information" to the radio base station eNB#2 that manages the cell#2.

In step S1003, the radio base station eNB#2 sends "HO Preparation Ack" including "C-RNTI#11 that is one of the C-RNTI that can be used in the cell#2, to the radio base station eNB#1.

In step S1004, the radio base station eNB#1 sends "RRC Reconfiguration (HO Command)" including "C-RNTI#11" to the mobile station UE.

In step S1005, the mobile station UE sends "HARQ Ack" to notify the successful reception of "RRC Reconfiguration (HO Command)" in an MAC layer (layer 2), to the radio base station eNB#1.

In step S1006, the mobile station UE moves to the cell#2 instructed by the "RRC Reconfiguration (HO Command)" and establishes a downlink synchronization for the cell#2.

In step S1007, the mobile station UE sends "Common RA Preamble" to the radio base station eNB#2 via RACH.

In step S1008, the radio base station eNB#2 sends "RA Response" to the mobile station UE. The uplink resource that should be used in the next step 1009 is assigned by the "RA Response".

In step S1009, the mobile station UE sends "RRC Reconfiguration Complete (HO Complete)" including "C-RNTI#11" and "second security information", to the radio base station eNB#2, by using the uplink resource assigned by the "RA response".

In step S1010, the radio base station eNB#2 executes a verification process on the mobile station UE by using the "second security information" included in the "first security information" and the "RRC Reconfiguration Complete (HO Complete)" notified by the radio base station eNB#1.

Also, the radio base station eNB#2 determines whether the "C-RNTI#11" included in "RRC Reconfiguration Complete (HO Complete)" is the C-RNTI that can be used in the cell#2.

Here, if the determination result is "Yes", the operation proceeds to step S1011, and if the determination result is "No", the radio base station eNB#2 discards the "RRC Reconfiguration Complete (HO Complete)".

If a predetermined period elapses in such a state, the "Re-establishment (step S108 shown in FIG. 2)" is executed by the mobile station UE.

In step S1011, the radio base station eNB#2 sends "HARQ Ack" to notify the successful reception of "RRC Reconfiguration Complete (HO Complete)" in the MAC layer (layer 2), to the mobile station UE.

In step S1012, the radio base station eNB#2 sends "Path Switch" to a mobile switching machine MME.

In step S1013, when data addressed to the mobile station UE is generated, the radio base station eNB#2 sends scheduling information to the mobile station UE by using "PDCCH (Physical Downlink Control Channel)" that uses "C-RNTI#11".

In step S1014, the radio base station eNB#2 sends "RRC Reconfiguration Complete Acknowledgement" to the mobile station UE.

In step S1015, the radio base station eNB#2 sends data (U-Plane Data) addressed to the mobile station UE, to the mobile station UE, by using a downlink resource assigned by the scheduling information.

Alternatively, the mobile station UE, in step S1015, sends the data (U-Plane Data) addressed to the cell#2, to the radio base stations eNB#2, by using an uplink resource assigned by the scheduling information.

In step S1016, the radio base station eNB#2 sends "RLC Status" that is transmission acknowledgement information of the RLC layer, to the mobile station UE.

In step S1017, the radio base station eNB#2 sends the "Release Resource" to the radio base station eNB#1.

Operation and Effect of Mobile Communication System According to First Embodiment of Present Invention According to the mobile communication system based on the first embodiment of the present invention, when the second radio base station eNB#2 receives the "HO Complete" including C-RNTI other than C-RNTI that can be used in the cell#2 from the mobile station UE, since there is no response to the "HO Complete", the "Re-establishment" in S108 shown in FIG. 2 is executed, and therefore, the "Deadlock" state can be avoided when the "PCI Confusion" is generated.

Figure 7:
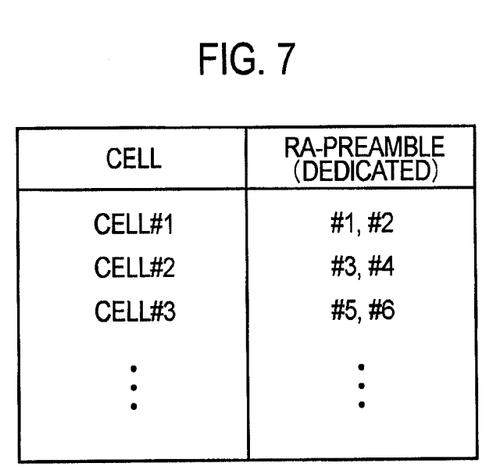
FIG. 7 is a diagram showing an example of Ra Preamble used in each cell in the mobile communication system according to a second embodiment of the present invention.
Figure 8:
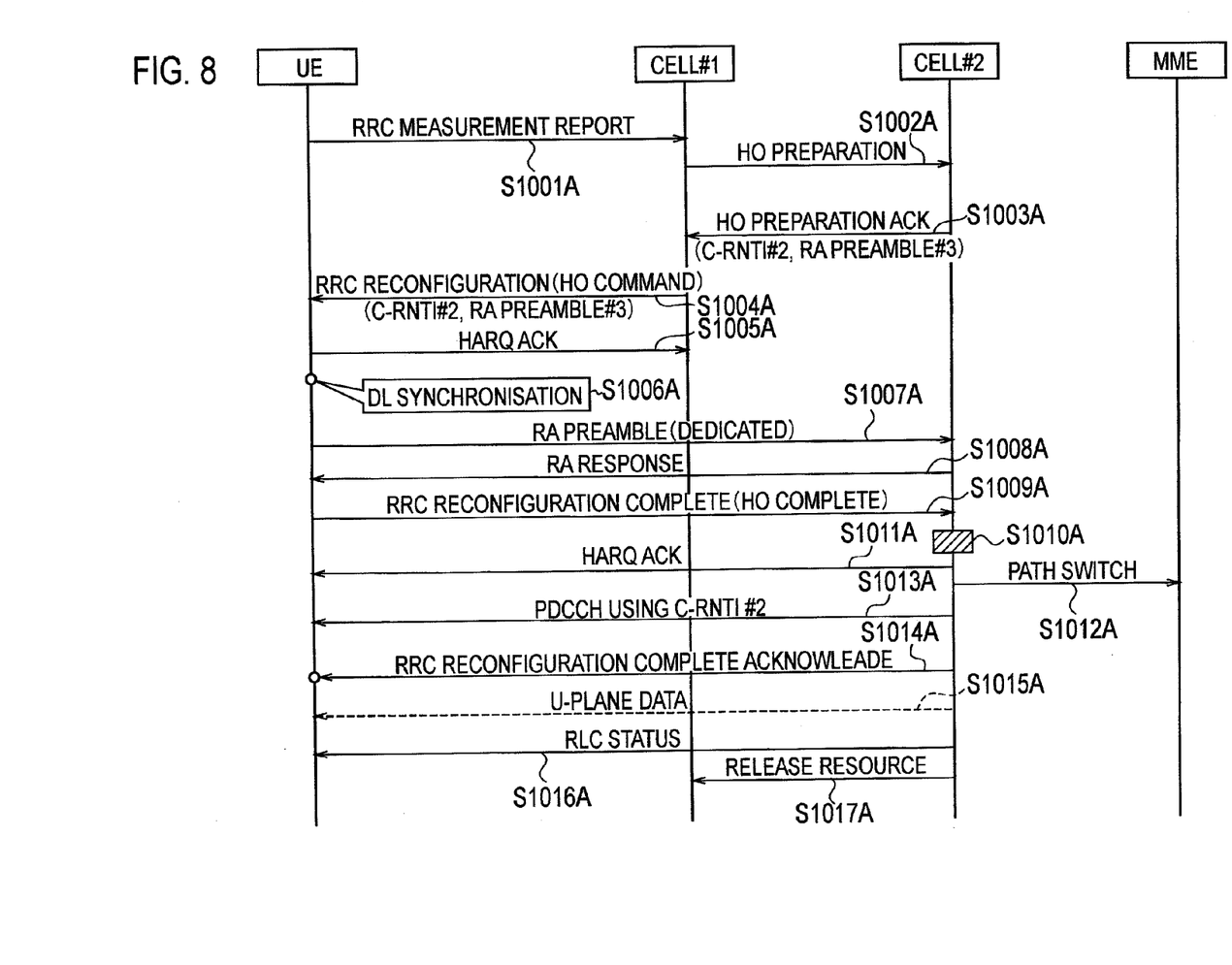
FIG. 8 is a sequence chart showing the operation of a mobile communication system according to a second embodiment of the present invention.

Mobile Communication System According to Second Embodiment of the Present Invention With reference to FIG. 7 and FIG. 8, a mobile communication system according to a second embodiment of the present invention is described. The description given below emphasizes a difference between the mobile communication system according to the second embodiment of the present invention and the mobile communication system according to the first embodiment of the present invention.

The mobile communication system according to the present embodiment is configured in such a way that when "PCI Confusion" is generated, the "Re-establishment" in step S104 shown in FIG. 2 is executed. The mobile communication system of the present embodiment configured in such a way is described below.

When the radio base station eNB operates as the radio base station eNB#2 that manages the "cell#2 (Target cell)", the storage unit 10 is configured to manage "Dedicated RA Preamble (individual random access preamble)" that can be used in the cell#2.

Further, in the mobile communication system according to the present embodiment, the "Dedicated RA Preamble" that can be used in each cell is specified, as shown in FIG. 7.

These usable "Dedicated RA Preambles" are specified to avoid the overlapping between the cells that may lead to "PCI confusion" (in other words, between neighboring cells using identical PCI).

For example, the configuration is such that if the radio base station eNB operates as the radio base station eNB#2, the transmission unit 11 sends "Dedicated RA Preamble (for example, Dedicated RA Preamble#3)" assigned to the mobile station UE by "Ho Command (handover control signal)" from among the "Dedicated RA Preamble" that can be used in the cell#2, to the radio base station eNB#1, by "HO Preparation ACK" for "HO Preparation" received from the radio base station eNB#1.

Also, when the radio base station eNB operates as the above radio base station eNB#2, the determination unit 13 is configured to determine whether the "Dedicated RA Preamble" received from the mobile station UE is the "Dedicated RA Preamble" that can be used in the cell#2.

Moreover, when the determination unit 13 determines that the "Dedicated RA Preamble" received from the mobile station UE is the "Dedicated RA preamble" that can be used in the cell#2, the transmission unit 11 is configured to send the "RA Response" to the mobile station UE.

On the other hand, when determination unit 13 determines that the "Dedicated RA Preamble" received from the mobile station UE is not the "Dedicated RA preamble" that can be used in the cell#2, the transmission unit 11 is configured not send the "RA Response" to the mobile station UE.

The operation of the mobile communication system according to the second embodiment of the present invention is described with reference to FIG. 8. Further, the description given below emphasizes a difference between the operation of the mobile communication system according to the second embodiment of the present invention and the operation described in the preceding FIG. 9.

As shown in FIG. 8, in step S1001A, the mobile station UE sends "RRC Measurement Report" to the radio base station eNB#1 that manages the cell#1.

In step S1002A, the radio base station eNB#1 sends "HO Preparation" including the "first security information" to the radio base station eNB#2 that manages the cell#2.

In step S1003A, the radio base station eNB#2 sends "HO Preparation Ack" including the "Dedicated RA Preamble#3" that is one of the "Dedicated RA Preamble" that can be used in the cell#2, to the radio base station eNB#1.

In step S1004A, the radio base station eNB#1 sends the "RRC Reconfiguration (HO Command)" including the "Dedicated RA Preamble#3" to the mobile station UE.

In step S1005A, the mobile station UE sends "HARQ Ack" to notify the successful reception of the "RRC Reconfiguration (HO Command)" in the MAC layer (layer 2), to the radio base station eNB#1.

In step S1006A, the mobile station UE moves to the cell#2 as instructed by the "RRC Reconfiguration (Ho Command)" and establishes a downlink synchronization for the cell#2.

In step S1007A, the mobile station UE sends the "Dedicated RA Preamble#3" included in the "RRC Reconfiguration (HO Command)" to the radio base station eNB#2 via RACH.

Here, when the radio base station eNB#2 determines that the received "Dedicated RA Preamble#3" is the "Dedicated RA Preamble" that can be used in the cell#2, the radio base station eNB#2 sends the "RA Response" to the mobile station UE in step S1008A. The uplink resource that should be used in the next step 1009A is assigned by the "RA Response".

On the other hand, when the received "Dedicated RA Preamble#3" is not the "Dedicated RA Preamble" that can be used in the cell#2, the radio base station eNB#2 does not send the "RA Response" to the mobile station UE in step S1008A.

If a predetermined period elapses in this state, the "Reestablishment (step S104 shown in FIG. 2)" is executed by the mobile station UE.

In step S1009A, the mobile station UE sends the "RRC Reconfiguration Complete (HO Complete)" including the "second security information" by using the uplink resource assigned by the "RA Response", to the radio base station eNB#2.

In step S1010A, the radio base station eNB#2 executes a verification process on the mobile station UE by using the "second security information" included in the "first security information" and the "RRC Reconfiguration Complete (HO Complete)" notified by the radio base station eNB#1.

In step S1011A, the radio base station eNB#2 sends the "HARQ Ack" to notify the successful reception of the "RRC Reconfiguration Complete (HO Complete)" in the MAC layer (layer 2), to the mobile station UE.

In step S1012A, the radio base station eNB#2 sends the "Path Switch" to the mobile switching machine MME.

In step S1013A, when the data addressed to the mobile station UE is generated, the radio base station eNB#2 sends the scheduling information to the mobile station UE by using the "PDCCH (Physical Downlink Control Channel)" that uses "new C-RNTI" in the cell#2.

In step S1014A, the radio base station eNB#2 sends the "RRC Reconfiguration Complete Acknowledgement" to the mobile station UE.

In step S1015A, the radio base station eNB#2 sends the data (U-Plane Data) addressed to the mobile station UE, to the mobile station UE, by using the downlink resource assigned by the scheduling information.

Alternatively, in step S1015A, the mobile station UE sends the data (U-Plane Data) addressed to the cell#2 to the radio base station eNB#2 by using the uplink resource assigned by the scheduling information.

In step S1016A, the radio base station eNB#2 sends the "RLC Status" that is transmission acknowledgement information of an RLC layer, to the mobile station UE.

In step S1017A, the radio base station eNB#2 sends the "Release Resource" to the radio base station eNB#1.

According to the mobile communication system based on the second embodiment of the present invention, when the mobile station UE sends the "Dedicated RA Preamble" other than the "Dedicated RA Preamble" that can be used in the cell#2, since the second radio base station eNB#2 does not respond to the "Dedicated RA Preamble", the "Re-establishment" of step S104 shown in FIG. 2 is executed, and therefore, the "Deadlock" state can be avoided when the "PCI Confusion" is generated.

The characteristics of the present embodiment as described above may be expressed as follows.

A gist of a first characteristic of the present embodiment is a handover method in which a mobile station UE performs handover from a cell #1 (a first cell) to a cell #2 (a second cell), and a radio base station eNB #1 (a first radio base station) that manages the cell #1 including a step of transmitting "HO Command (a handover command signal)" including C-RNTI (mobile station identification information) that can be used in the cell #2, to the mobile station UE, and a step in which the mobile station UE transmits "Common RA Preamble (a common random access preamble)" to a radio base station eNB#2 (a second radio base station) that manages the cell #2, after receiving "HO Command", and a step in which the mobile station UE transmits "HO Complete (a handover completion signal)" including C-RNTI included in "HO Command", to the radio base station eNB #2, after receiving "RA Response (a random access response)" to "Common RA Preamble", and a step in which the radio base station eNB#2 notifies a radio resource assigned to the mobile station UE by using C-RNTI included in "HO Complete", when it is determined that C-RNTI included in "HO Complete" is C-RNTI that can be used in the cell #2.

In the first characteristic of the present embodiment, the mobile station UE may further comprises a step of performing a reconnection procedure when a predetermined period elapses (for example, when a timer T304 is expired), without receiving "HARQ Ack (a response)" from the radio base station eNB #2, after the mobile station UE transmitting the "HO Complete".

In the first characteristic of the present embodiment, the radio base station eNB #2 may further comprise a step of discarding "HO Complete" without responding to "HO Complete", when it is determined that the C-RNTI included in "HO Complete" is not the C-RNTI that can be used in the cell #2.

A gist of a second characteristic of the present embodiment is a handover method in which a mobile station UE performs handover from a cell #1 to a cell #2, comprising a step in which the radio base station eNB #1 that manages the cell #1 transmits the "HO Command" including C-RNTI, to the mobile station UE, and a step in which the mobile station UE transmits "Dedicated RA Preamble (an individual random access preamble)" that can be used in the cell #2, to the radio base station eNB #2 that manages the cell #2, after the mobile station UE receiving "HO Command", and a step in which the radio base station eNB #2 transmits "RA Response" to the mobile station UE when it is determined that the received "Dedicated RA Preamble" is "Dedicated RA Preamble" that can be used in the cell #2, and a step in which the mobile station UE transmits "HO Complete" to the radio base station eNB #2, after the mobile station UE receiving "RA Response", and a step in which the radio base station eNB #2 notifies a radio resource assigned to the mobile station UE, after the radio base station eNB #2 receiving "HO Complete".

In the second characteristic of the present embodiment, the mobile station UE may further comprise a step of performing a reconnection procedure when a predetermined period elapses (for example, when a timer T304 is expired), without receiving the "RA Response", after the mobile station UE transmitting "Dedicated RA Preamble".

In the second characteristic of the present embodiment, the radio base station eNB #2 may further comprise a step of not transmitting "the RA Response" to the mobile station UE, when it is determined that the received "Dedicated RA Preamble" is not "Dedicated RA Preamble" that can be used in the cell #2.

A gist of a third characteristic of the present embodiment is a radio base station eNB that can operate, when a mobile station UE performs handover from the cell #1 to the cell #2, as the radio base station eNB#2 that manages the cell #2, comprising a transmission unit 11 configured to transmit C-RNTI that can be used in the cell #2, to the radio base station eNB #1, in response to "HO Preparation (a handover preparation signal)" received from the radio base station eNB #1 that manages the cell #1, and a resource assignment unit 14 configured to notify a radio resource assigned to the mobile station UE by using C-RNTI included in "HO Complete", when it is determined that C-RNTI included in "HO Complete" received from the mobile station UE that can be used in the cell #2.

In the third characteristic of the present embodiment, the resource assignment unit 14 is configured to discard "HO Complete" without responding to "HO Complete", when it is determined that C-RNTI included in "HO Complete" is not C-RNTI that can be used in the cell #2.

In the fourth characteristic of the present embodiment is the radio base station eNB that can operate, when a mobile station UE performs handover from the cell #1 to the cell #2, as the radio base station eNB #2 that manages the cell 2, comprising a transmission unit 11 configured to transmit "RA Response" to the mobile station UE, when it is determined that "Dedicated RA Preamble" received from the mobile station UE is "Dedicated RA Preamble" that can be used in the cell #2, and a resource assignment unit 14 configured to notify a radio resource assigned to the mobile station UE, when "HO Complete" is received from the mobile station UE after transmitting "RA Response" to the mobile station UE.

In the fourth characteristic of the present embodiment, the resource assignment unit 14 may be configured not to transmit "RA Response" to the mobile station UE, when it is determined that "Dedicated RA Preamble" received from the mobile station UE is not "Dedicated RA Preamble" that can be used in the cell #2.

A gist of a fifth characteristic of the present embodiment is a mobile station UE capable of performing handover from the cell #1 to the cell #2, comprising transmitting "the Common RA Preamble" to the radio base station eNB #2 that manages the cell #2, after receiving "the HO Command" including C-RNTI that can be used in the cell #2 from the radio base station eNB #1 that manages the cell #1, and the transmission unit 21 configured to transmit "HO Complete" including C-RNTI included in "the HO Command", to the radio base station eNB #2, after receiving "RA Response" to "the Common RA Preamble".

In the fifth characteristic of the present embodiment, the mobile station UE may further comprise a reconnection procedure implementation unit 23 configured to perform a reconnection procedure when a predetermined period elapses (for example, when a timer T304 is expired), without receiving "HARQ Ack (a response)" from the radio base station eNB #2 after transmitting "the HO Command".

A gist of a sixth characteristic of the present embodiment is a mobile station UE capable of performing handover from the cell #1 to the cell #2, comprising transmission unit 21 configured to transmit "Dedicated RA Preamble" that can be used in the cell #2 to the radio base station eNB #2 that manages the cell #2, after receiving "the HO Command" from the radio base station eNB #1 that manages the cell #1, and transmission unit configured to transmit "HO Complete" to "the radio base station eNB#2" after receiving "RA Response" to "Dedicated RA Preamble" from the radio base station eNB #2.

In the sixth characteristic of the present embodiment, the mobile station UE may further comprise a reconnection procedure implementation unit 23 configured to perform a reconnection procedure when a predetermined period elapses (for example, when a timer T304 is expired), without receiving "RA Response" after transmitting "Dedicated RA Preamble".

Thus, when the mobile station UE performs the handover to the radio base station eNB#2 that manages a cell different from the cell instructed by the "HO Command" sent by the radio base station eNB#1 due to "PCI Confusion" and when "HO Complete" is sent, fatal problems such as interference can be avoided if the radio base station eNB#2 does not respond to the "HO Complete".

In order for the radio base station eNB#2 not to receive the "HO Complete" or to ensure the discarding of the receipt even after receiving the "HO Complete, as described in detail before, it is conceivable that the "C-RNTI" that can be used in each cell or "Dedicated RA Preamble" is split.

It suffices that the range of the "C-RNTI" that can be used or the "Dedicated RA Preamble" is split between the neighboring cells in which the "PCI confusion" can occur.

Also, in order for the radio base station eNB#2 not to receive the "HO Complete" or to ensure the discarding of the receipt even after receiving, it is possible to set that the configuration of "PRACH", the physical random access channel, which sends the "Common RA Preamble" to "Dedicated RA Preamble" is differed among the neighboring cells in which "PCI confusion" can occur.

Examples of the different setting include: a setting of "root sequence" for generation of series of "RA Preamble" is changed, and a physical resource blocks assignment of time/frequency direction of "PRACH", that is, "PRACH configuration", is changed.

The setting of the previously mentioned usable "C-RNTI" and "Dedicated RA Preamble", setting of "root sequence" and "PRACH configuration" may be automatically set according to a "plug and play" procedure at the time of starting the radio base station, for example.

For example, at the time of starting the radio base station, an OAM server may be connected and the setting may be set for the radio base station from the OAM server.

Note that the neighboring cells where "PCI confusion" can occur denote, when an arbitrary cell is noticed, an aggregate of cells which utilize an identical PCI among the candidate cells that are subjected to handover from the cells.

The cell included in a set of the neighboring cells in which "PCI confusion" can occur may be automatically sought by a "plug and play" function provided in the radio base station.

It is noted that the operation of the above-described the radio base station eNB, Mobile switching center MME or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB, Mobile switching center MME or the mobile station UE. Further, such a storage medium or a processor may be arranged, as a discrete component, in the radio base station eNB, Mobile switching center MME or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A handover method in which a mobile station performs handover from a first cell to a second cell, wherein the second cell is allocated with a set of dedicated random access preambles which are not in common with preambles allocated to a third cell being a neighboring cell to said second cell, the method comprising:
    a step in which a first radio base station that manages the first cell transmits a handover command signal including mobile station identification information, to the mobile station;
    a step in which the mobile station transmits a dedicated random access preamble comprised in said set of dedicated random access preambles, to a second radio base station that manages the second cell, after receiving the handover command signal;
    a step in which the second radio base station transmits a random access response to the mobile station when it is determined that the received dedicated random access preamble is a dedicated random access preamble comprised in said set of dedicated random access preambles;
    a step in which the mobile station transmits a handover completion signal to the second radio base station, after receiving the random access response;
    a step in which the second radio base station notifies a radio resource assigned to the mobile station, after receiving the handover completion signal; and
    a step in which the second radio base station does not transmit the random access response to the mobile station when it is determined that the received dedicated random access preamble is not comprised in said set of dedicated random access preambles.

2. The handover method according to claim 1, wherein the mobile station further comprises a step of performing a re-establishment procedure when a predetermined period elapses, without receiving the random access response, after transmitting the dedicated random access preamble.

3. A radio base station that can operate, when a mobile station performs handover from a first cell to a second cell, as a second radio base station that manages the second cell, wherein the second cell is allocated with a set of dedicated random access preambles which are not in common with preambles allocated to a third cell being a neighboring cell to said second cell, the radio base station comprising:
    a transmission unit configured to transmit a random access response to the mobile station, when it is determined that a dedicated random access preamble received from the mobile station is a dedicated random access preamble comprised in said set of dedicated random access preambles; and
    a resource assignment unit configured to notify a radio resource assigned to the mobile station, when the handover completion signal is received from the mobile station after transmitting the random access response to the mobile station,
    wherein the resource assignment unit is configured not to transmit the random access response to the mobile station, when it is determined that the dedicated random access preamble received from the mobile station is not a dedicated random access preamble comprised in said set of dedicated random access preambles.

4. A mobile communication system comprising a radio base station according to claim 3 and a mobile station capable of communication with said base station.

5. A mobile station capable of performing handover from a first cell to a second cell, wherein the second cell is allocated with a set of dedicated random access preambles which are not in common with preambles allocated to a third cell being a neighboring cell to said second cell, the mobile station comprising:
    a random access preamble transmission unit configured to transmit a dedicated random access preamble comprised in said set of dedicated random access preambles to a second radio base station that manages the second cell, after receiving a handover command signal from the first radio base station that manages the first cell;
    a handover completion signal transmission unit configured to transmit a handover completion signal to the second radio base station after receiving a random access response to the dedicated random access preamble from the second radio base station.

6. The mobile station according to claim 5, further comprising a re-establishment procedure implementation unit configured to perform a re-establishment procedure when a predetermined period elapses, without receiving the random access response after transmitting the dedicated random access preamble.

* * * * *